United States Patent
Beilker

(10) Patent No.: US 12,307,030 B2
(45) Date of Patent: May 20, 2025

(54) DISPLAY WITH A ROTARY CONTROL MOUNTED ON THE DISPLAY

(71) Applicant: Continental Automotive Technologies GmbH, Hannover (DE)

(72) Inventor: Dirk Beilker, Frankfurt (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/266,866

(22) PCT Filed: Dec. 7, 2021

(86) PCT No.: PCT/DE2021/200251
§ 371 (c)(1),
(2) Date: Jun. 13, 2023

(87) PCT Pub. No.: WO2022/128020
PCT Pub. Date: Jun. 23, 2022

(65) Prior Publication Data
US 2025/0085795 A1    Mar. 13, 2025

(30) Foreign Application Priority Data
Dec. 15, 2020 (DE) .......................... 102020215888.6

(51) Int. Cl.
*G06F 3/0362* (2013.01)
*G05G 1/015* (2008.04)
(Continued)

(52) U.S. Cl.
CPC ........... *G06F 3/0362* (2013.01); *G05G 1/015* (2013.01); *G05G 1/02* (2013.01); *G05G 1/10* (2013.01);
(Continued)

(58) Field of Classification Search
CPC .. G06F 3/0362; G06F 3/03547; G06F 3/0393; G05G 1/015; G05G 1/02; G05G 1/10; G05G 5/05; G05G 2505/00
See application file for complete search history.

(56) References Cited

U.S. PATENT DOCUMENTS 11,579,665 B2 *   2/2023   Hinson ................. G06F 3/0362
11,650,675 B2 *   5/2023   Martin .................. G06F 3/0393
                                                          345/156
(Continued)

FOREIGN PATENT DOCUMENTS

DE    102011114051 A1    3/2013
FR       3033422 A1      9/2016
(Continued)

OTHER PUBLICATIONS

"Descrpitive Geometry", Descriptive Geometry for Architects (httpsJÁveb.archive.org/web/20170g170B042BlhftpJÁrww.mathematik.tu-darmstadt.de/-ehartmann/dga-incl-loes.pdf) (PDF; 1.5 MB). Script (Uni Darmstadt), p. 62, 2017.
(Continued)

*Primary Examiner* — Jonathan A Boyd

(57) ABSTRACT

A display comprising a rotary control mounted on the display, wherein the display has touch sensors, wherein a handle of the rotary control is rotatably mounted about an axis of rotation and has at least one counter electrode and the rotational position of the handle of the rotary control is determined by evaluation of the touch sensors, wherein the counter electrode is configured as a hollow cylinder, wherein the handle has an upper and a lower contour, wherein the lower contour is arranged closer to the display than the upper contour, wherein the lower contour is configured as the hollow cylinder and wherein the development of the lower contour is sinusoidal is disclosed. A method for evaluating (Continued)

the position of the above-described rotary control is also disclosed.

9 Claims, 2 Drawing Sheets

(51) Int. Cl.
  *G05G 1/02* (2006.01)
  *G05G 1/10* (2006.01)
  *G05G 5/05* (2006.01)
  *G06F 3/0354* (2013.01)
  *G06F 3/039* (2013.01)

(52) U.S. Cl.
  CPC ........... *G05G 5/05* (2013.01); *G06F 3/03547* (2013.01); *G06F 3/0393* (2019.05); *G05G 2505/00* (2013.01)

(56) References Cited

U.S. PATENT DOCUMENTS

| 11,681,385 | B2* | 6/2023 | Kara | G01D 5/25 345/174 |
| 11,681,430 | B2* | 6/2023 | Choi | G06F 3/041 345/184 |
| 11,861,083 | B2* | 1/2024 | Schmidt | G06F 3/016 |
| 2014/0042004 | A1* | 2/2014 | Tseng | G06F 3/0362 200/336 |
| 2018/0084937 | A1 | 3/2018 | Joo et al. | |
| 2020/0174585 | A1 | 6/2020 | Ju et al. | |
| 2020/0301547 | A1* | 9/2020 | Mori | G06F 3/0488 |

FOREIGN PATENT DOCUMENTS

| JP | 2016218542 A | 12/2016 |
| JP | 6685479 B1 | 4/2020 |

OTHER PUBLICATIONS

Search Report dated Aug. 4, 2021 from corresponding German patent application No. 10 2020 215 888.6.
International Search Report and Written Opinion dated Mar. 18, 2022 from corresponding International patent application No. PCT/DE2021/200251.
Office Action issued Nov. 22, 2024 from corresponding Korean patent application No. 10-2023-7016649.

\* cited by examiner

DISPLAY WITH A ROTARY CONTROL MOUNTED ON THE DISPLAY

CROSS REFERENCE TO RELATED APPLICATIONS

This U.S. patent application claims the benefit of PCT application No. PCT/DE2021/200251, filed Dec. 7, 2021, which claims the benefit of German patent application No. 10 2020 215 888.6, filed Dec. 15, 2020, both of which are hereby incorporated by reference.

TECHNICAL FIELD

The present disclosure relates to a display with a rotary control mounted on the display.

BACKGROUND

Such displays in which the display has capacitive touch sensors are known from the prior art. So-called touchscreens are thus produced. In individual configurations of these touchscreens, the handle of the rotary control is arranged in front of the touchscreen and mounted rotatably about an axis. Thus, values may be selected and/or modified from a value range in a particularly simple fashion. Such known rotary controls have at least one counter electrode which the touch sensors of the touchscreen influence. The rotational position of the rotary control may be determined by an evaluation made by the touch sensors.

The rotary knob of the rotary control is generally made in the prior art of a conductive material which is connected to one or more counter electrodes which are arranged in a circle or ring directly above the touch sensors. The touch sensors are configured as transparent and are arranged either directly on or inside the display (so-called in-cell touch) and are covered by a glass or plastic surface. Thus, for example, a structure is known in which an annular rotary control with a very wide transparent pivot with a magnifying glass effect is used such that the display contents may be viewed through the pivot. A structure is furthermore known in which just one individual small counter electrode slides over the glass or plastic surface when the rotary control is rotated and acts only on the nearest touch sensors.

When one or more annularly arranged counter electrodes are used, a small change in the spacing between the touch sensors and counter electrodes (for example, due to mechanical tolerances or contamination) may already influence the position value of the rotary control. The use of resilient counter electrodes which press uniformly on the user interface requires a relatively complex structure, with many components, which is difficult to add in the existing structural space and is thus expensive. Resilient counter electrodes grind against the user interface and cause noise and wear which influences the sensor value.

The object of the disclosure is therefore to provide a simple robust structure with few components, and an evaluation method which remains largely uninfluenced by mechanical tolerances.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In an embodiment, because the counter electrode is configured as a hollow cylinder, the handle having an upper and a lower contour, the lower contour being arranged closer to the display than the upper contour, the lower contour being configured as a hollow cylinder, and the development of the lower contour being sinusoidal, a simple structure is achieved which is additionally not sensitive to component tolerances.

In an embodiment, the sinusoidal development may be achieved particularly simply if the lower contour corresponds to an obliquely truncated tube.

In an embodiment, if the handle is rotatably mounted about a cylinder, the structure may be configured particularly simply. Thus, the handle may, for example, have an internal diameter which is not significantly greater than the external diameter of the cylinder. If a loose fit between the two structural elements is chosen, the handle may be rotated safely about the cylinder.

Particularly simple is the structure when the cylinder is rigidly connected to the surface of the display.

Additional functions may be produced if the handle is axially movable. Thus, for example, specific values, value ranges, functions and/or appliances may be scrolled to by rotating the handle, and selected by axial displacement of the handle.

In an embodiment, if the handle is held in an axial position by a spring element, the above-described selection function may be performed by pushing on the handle in an axial direction.

In an embodiment, if the axis of rotation is configured so that it may be displaced, the position of the handle on the display may be modified by a user of the handle to a preferred place. Thus, for example, the position of the cylinder may be fixed by a displaceable support arranged above the display.

In an embodiment, because the sensor values of all the touch sensors which are situated below the counter electrode and are influenced by the latter are evaluated, and because the vectorial evaluation of these sensor values specifies the rotational position of the rotary control, the influence of mechanical tolerances which are caused by tilting and/or changing the spacing of the handle is compensated.

In an embodiment, if the value of the total vector is used for determining the spacing of the counter electrode from the display, an input function may also be achieved simply with the handle by axially modifying the position, for example by pushing or pulling the handle.

The disclosure will be explained below with the aid of a particularly preferred exemplary embodiment. Other objects, features and characteristics of the present disclosure, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

DETAILED DESCRIPTION

Figure 1:
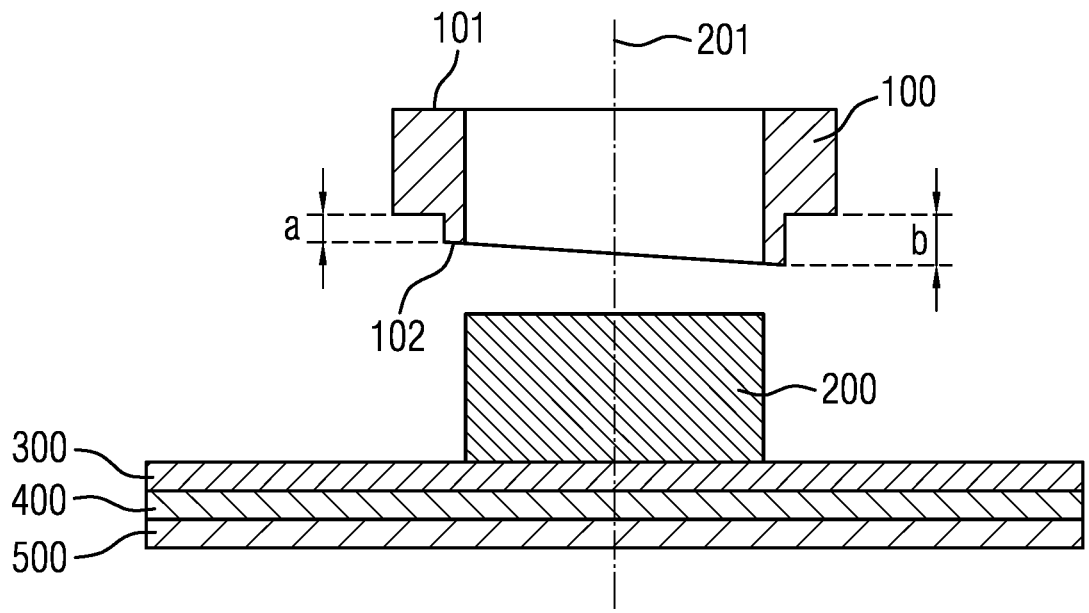
FIG. 1 shows a section through a display with a rotary control mounted on the display, wherein a handle of the rotary control is not situated in an operating position.

Visible in FIG. 1 is a handle 100 with an upper contour 101 and a lower contour 102, a cylinder 200 with an axis of symmetry 201, a user interface 300, touch sensors 400, a display 500, and a thumb 601 and a finger 602 of a user who is otherwise not illustrated. The lower contour 102 of the handle 100 forms the counter electrode and is slanted. This is apparent from the fact that the spacing a is smaller than the spacing b from the otherwise symmetrically configured rotary control 100. A sinusoidal development of the lower contour 102 is thus achieved. The rotary control 100 is also rotated about the axis of symmetry 201 of the cylinder 200. This is achieved during operation by the handle being pushed at least partially onto the cylinder 200 and the axis of rotation of the handle 100 thus being predefined. The cylinder 200 may be configured as solid (as illustrated) but may also be configured as hollow. The user interface 300 protects the touch sensors 400 and the display 500 and may be configured from a transparent plastic, from glass, or from another transparent material. The display 500 may be configured as an electro-optical display such as, for example, as a liquid crystal display or an LED display. In the exemplary embodiment, the touch sensors 400 are arranged in front of the display 500 but may also be arranged inside the display 500 between individual pixels of the display 500.

Figure 2:
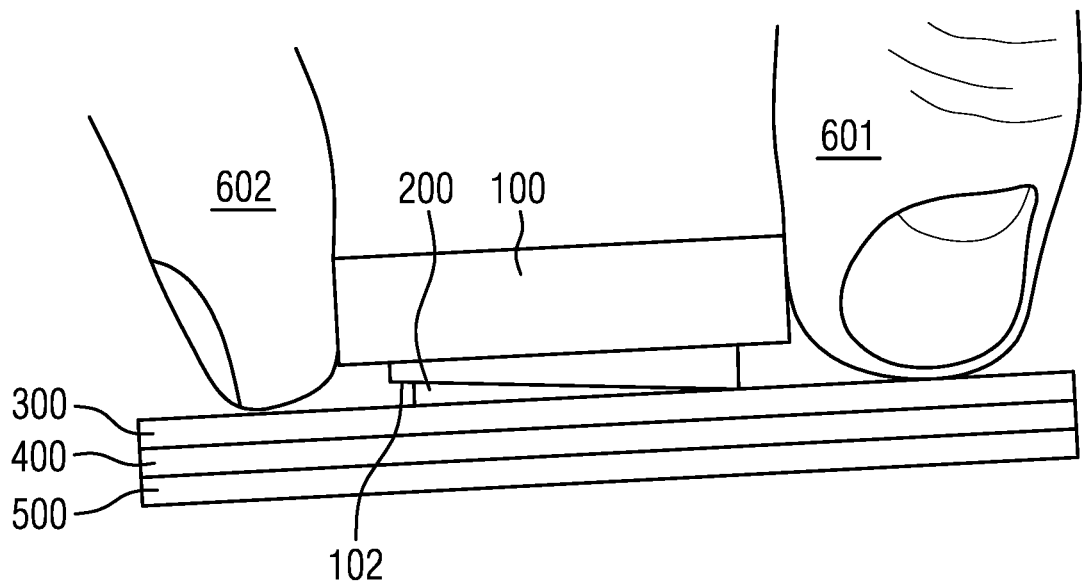
FIG. 2 shows the view of the display and the rotary control from FIG. 1 in an operating position with the thumb and finger of a user who is otherwise not illustrated.

In addition to the parts described in FIG. 1, a thumb 601 and a finger 602 of a user who is otherwise not illustrated may be seen in FIG. 2. The handle 100 is arranged in a use position and thus pushed onto the cylinder 200. A catch which is not illustrated prevents the handle 100 from being able to slide completely off the cylinder 200. It is possible to configure the catch such that the handle cannot be moved in an axial direction but it is also possible to provide a certain axial adjustability and thus enable additional functionality of the rotary control. In this case, the handle 100 is held in a specified axial position by a spring element. The handle 100 may be moved, for example, by a user who is otherwise not illustrated with their thumb 601 and finger 602. If an axial adjustability of the handle 100 is provided, the handle may also still be pulled in an axial direction.

It may also be clearly seen in FIG. 2 that the lower contour 102 of the handle 100 of the rotary control is slanted: a gap between the lower contour 102 of the rotary control 100 and the user interface 300 is situated on the left-hand side, whilst the lower contour 102 bears against the user interface 300 on the right-hand side.

Figure 3:
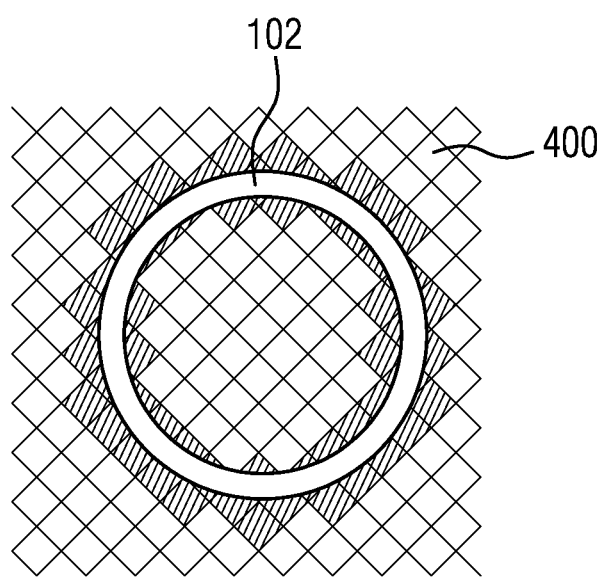
FIG. 3 shows the view from above of a counter electrode and touch sensors from FIGS. 1 and 2.

A number of touch sensors 400 and the lower contour 102 of the otherwise not illustrated rotary control may be seen in FIG. 3. The touch sensors 400 are configured as square but may also have a different shape such as, for example, round or oval. Touch sensors 400 which are situated below the counter electrode (=lower contour 102 of the handle) are illustrated as black squares and the other touch sensors 400 are illustrated as white squares.

The invention claimed is:

1. A display comprising:
a rotary control mounted on the display, wherein the display has touch sensors, wherein a handle of the rotary control is rotatably mounted about an axis of rotation and has at least one counter electrode and the rotational position of the handle of the rotary control is determined by evaluation of the touch sensors, wherein the counter electrode is configured as a hollow cylinder, wherein the handle has an upper and a lower contour, wherein the lower contour is arranged closer to the display than the upper contour, wherein the lower contour is configured as the hollow cylinder and wherein the development of the lower contour is sinusoidal.

2. The display as claimed in claim 1, wherein the lower contour corresponds to an obliquely truncated tube.

3. The display as claimed in claim 1, wherein the handle is rotatably mounted about a cylinder.

4. The display as claimed in claim 3, wherein the cylinder is rigidly connected to a user interface of the display.

5. The display as claimed in claim 1, wherein the handle is axially movable.

6. The display as claimed in claim 5, the handle is held in an axial position by a spring element.

7. The display as claimed in claim 1, wherein the axis of rotation is configured as displaceable.

8. A method for evaluating the position of a rotary control, the method comprising:
evaluating sensor values of touch sensors which are situated below a counter electrode and are influenced by the electrode; and
evaluating the vectorial evaluation of the sensor values which specifies the rotational position of the rotary control.

9. The method as claimed in claim 8, wherein the value of the total vector is used for determining the spacing of the counter electrode from the display.

* * * * *